United States Patent [19]

Burrier

[11] Patent Number: 4,646,666

[45] Date of Patent: Mar. 3, 1987

[54] METHOD OF PRECISION SEWING FOR JOINING FABRIC PIECES, AND FOR SIMULTANEOUSLY JOINING PIECES AND QUILTING

[76] Inventor: Karen S. Burrier, 2101 71st Ave. N., Brooklyn Center, Minn. 55430

[21] Appl. No.: 835,964

[22] Filed: Mar. 4, 1986

[51] Int. Cl.[4] .......................... D05B 97/00; B32B 7/08

[52] U.S. Cl. .................................. 112/266.1; 112/420; 112/439; 112/441

[58] Field of Search .................. 112/262.1, 266.1, 417, 112/420, 421, 435, 440, 441; 2/266, DIG. 2

[56] References Cited

U.S. PATENT DOCUMENTS

| | | | |
|---|---|---|---|
| 1,741,620 | 12/1929 | Fixler | 112/266.1 X |
| 2,141,560 | 12/1938 | Rudnik | 112/266.1 X |
| 3,725,959 | 4/1973 | Cruden | 2/266 X |
| 3,771,479 | 11/1973 | Mavis | 112/226.1 |
| 4,053,986 | 10/1977 | Axelrod | 112/266.1 |
| 4,244,996 | 1/1981 | Maloney | 112/423 X |
| 4,386,980 | 6/1983 | Fitzpatrick et al. | 156/63 |
| 4,395,964 | 8/1983 | Warren | 112/441 X |
| 4,427,472 | 1/1984 | Trager | 156/93 |

OTHER PUBLICATIONS

Creative Patchwork, H. Wellendorph, 1985, p. 12, Arco Publishing, Inc., New York, N.Y.

The It's Okay If You Sit on My Quilt Book, M. E. Hopkins, A Yours Truly Publication, 1982, pp. 7–10, Atlanta, Georgia.

*Primary Examiner*—H. Hampton Hunter

*Attorney, Agent, or Firm*—Merchant, Gould, Smith, Edell, Welter & Schmidt

[57] ABSTRACT

A method for producing accurately sewn piecework using a backing material is disclosed. The backing material includes a pattern having proposed stitching lines along which fabric pieces are to be joined to re-create the pattern. A first piece of fabric is placed against the bottom side of the backing material, or the side without the pattern. It is placed with the top or right side facing away from the backing, and is placed to cover a first portion of the pattern. A second fabric piece, chosen to cover a second adjacent portion of the pattern, and to be joined to the first piece, is placed with its top or right side against the top side of the first piece. The second fabric piece is positioned so that it overlaps the proposed stitching line between the first and second portions of the pattern, and extends across the first piece of fabric. The second piece is large enough to cover the second portion of the pattern.

From the top side of the backing, where the proposed stitching lines forming the pattern are visible and free of any obstructing fabric pieces, one sews along the proposed stitching line to form a seam. The second fabric piece is then folded away from the first fabric piece along the seam, so that it is substantially coplanar to the first piece and covers the second portion of the pattern. It is pressed and trimmed, if necessary. These general steps are repeated until the pattern has been re-created from joined fabric pieces. The backing material can then be removed, if desired.

An alternative embodiment includes similar steps but also provides for the addition of batting between the backing material and the fabric pieces, which permits one to accurately piece and quilt at the same time.

15 Claims, 27 Drawing Figures

METHOD OF PRECISION SEWING FOR JOINING FABRIC PIECES, AND FOR SIMULTANEOUSLY JOINING PIECES AND QUILTING

FIELD OF THE INVENTION

This invention relates to a method for producing accurately sewn piecework. The method involves the use of a backing material having a pre-printed design which is to be re-created from joined fabric pieces. Sewing of the pieces occurs directly on the backing material along the lines of the pre-printed design.

BACKGROUND OF THE INVENTION

There are many instances where it is desirable to join fabric pieces together by way of a seam such that the right or top sides of the joined fabric pieces face the same way, and the wrong or back sides face the same way. In these instances the seam allowances or edges along which the seam was formed appear only from the back side. This is typical where, for example, piecework is done to form quilt covers, decorative pillows, wall hangings, portions of clothing such as vest backs, and the like.

Methods for sewing together pieces of fabric or cloth to create a larger, attractively designed fabric piece composed of the smaller pieces can involve a greater deal of work.

Typically, pieces for the desired pattern or design are traced onto fabric, for example using a template, and then cut to the proper shape and size. In larger works such as quilt tops having intricate patterns, there can be literally hundreds of pieces which require such tracing and cutting.

Once the pieces are cut, they are sewn together, one piece to another. It requires great care to see that the pieces fit together correctly, because slight errors in seam allowances or measurements tend to throw off the positioning of neighboring pieces and can have a detrimental effect on the overall appearance and size of the finished product. Many times the pieces are of a triangular shape which causes one or more sides to be on the bias, which can cause stretching while being traced, cut, and/or sewn. In addition, many designs include fabric pieces which meet in points. It can be very difficult to place and sew the pieces correctly to achieve crisp points, especially if the angles are very acute.

When sewing pieces together, one generally does not have any drawn line to sew over; it is simply a matter of skill and judgment to see that the seams are sewn straight, and are the proper distance from the edges of the fabric pieces.

Attempts have been made to overcome some of these problems. For example, some patterns or designs are now made using a method called multiple strip piecing, which overcomes the need to individually trace and cut the pieces to be joined. Examples of multiple strip piecing can be seen in the *It's Okay If you Sit On My Quilt Book,* Yours Truly, Inc., 1982, by Mary Ellen Hopkins, on pages 7, 9, and 14. However, patterns or designs suitable for strip piecing are quite limited in that the design must generally be composed of strip or block-like segments. In addition, the seam allowances of the strips of fabric are estimated each time, causing the strip widths to vary. This makes it difficult to achieve a precisely sewn look with fabric strips of even width.

It is also known to use a backing when joining pieces together, typically for log cabin patterns. This approach is shown in *Creative Patchwork,* Arco Publishing, 1985, by Hanne Wellendorph, page 12. The backing is used to provide some stability and guidance in centering the fabric pieces. Typically, thre is no stitching line. When a backing is used, the fabric pieces are placed on the top of the backing and then sewn, with the backing as the undermost layer. Thus, even if there were a stitching line, it would not be visible as sewing takes place because a stitching line drawn on the backing would be covered by the fabric pieces.

It is also known to sew patchwork using the pin-precision piecing method in which seam lines are drawn on the back side of the individually cut fabric pieces, and pins are used to place the lines together while being sewn. This method is illustrated in *Quilt Hoops,* Gick Publishing, Inc., 1982, by Yvonne Amico, pages 12–13. Although this is a more precise method, the need for templates, tracing, cutting, and sewing many separate fabric pieces together still remains. Also, this method does not assist with the problem of stretching bias edges.

It is also known that one can strip piece and "quilt-as-you-go," as demonstrated in *Classic Quilted Vests,* Yours Truly, Inc., 1982, by M. Fons and E. Porter, page 42. The patterns are limited again to designs composed of strips. Also, the seam allowance is estimated each time, causing the strips to be uneven and possibly not meeting evenly at seams or at the garment front.

Accordingly, a need exists for a method of accurately and easily joining fabric pieces, which is adaptable to a wide variety of designs, including intricate patterns having acute angles, and patterns for miniatures. The method should not require individually pre-cut fabric pieces, should provide a stitching line along which to sew, and should provide stability to the pieces as they are sewn, allowing for very precise piecing.

BRIEF DESCRIPTION OF THE INVENTION

I have discovered a method for joining fabric pieces, with the aid of a backing material, to form a single piece of a fabric composed of joined fabric pieces. The joined fabric pieces can be sewn together with exceptional accuracy, permitting the formation of sharp, crisp angles and points in the desired pattern created by the joined fabric pieces. My method allows one to sew along a line which is visible and not covered by fabric. According to the method of my invention, one obtains a backing material, which is usually removable, that has a top side and a bottom side. The top side has thereon a pattern to be re-created from joined fabric pieces. The pattern includes a first portion having boundaries, and an adjacent second portion having boundaries. The first and second portions are separated by a proposed stitching line.

Also required is a first piece of fabric, having a front side and a back side. The first piece of fabric is larger than the first portion of the pattern.

Additionally required is a second piece of fabric having a front side and a back side. The second piece of fabric is larger than the second portion of the pattern.

According to the method of my invention, the back side of the first piece of fabric is placed against the bottom side of the backing material such that the first piece covers the first portion of the pattern and extends beyond the proposed stitching line.

The front side of the second piece of fabric is then placed against the front side of the first piece of fabric such that the second piece overlaps the proposed stitching line, and a sufficient amount of the second piece to cover the second portion extends from the proposed stitching line toward the first portion.

Next, one sews simultaneously through the layers of backing material, the first piece of fabric and the second piece of fabric by sewing along the proposed stitching line on the top side of the backing material. This joins the first and second pieces of fabric and forms a seam, resulting in a single piece of fabric composed of joined fabric pieces (which are also attached to the backing material).

Next, the second piece of fabric is folded away from the first piece of fabric and toward the second portion of the pattern, along the seam. The first piece of fabric and the second piece of fabric are then side by side in a substantially coplanar relationship and the second piece of fabric covers the second portion of the pattern.

Only basic sewing skills such as the ability to sew by machine along a marked straight line are needed to practice the method of my invention.

BRIEF DESCRIPTION OF THE DRAWINGS

The drawings aid in the understanding of the method of my invention.

FIG. 15 illustrates a first fabric piece covering a first portion of the design, and a second fabric piece placed over the first fabric piece, and stitching or seam line A-B.

FIG. 16 illustrates the second fabric piece folded away from the first fabric piece along seam line A-B.

FIG. 17 illustrates the trimming of the second fabric piece.

FIG. 18 illustrates the placement of an additional fabric piece, and stitching or seam line C-D.

FIG. 19 illustrates the additional fabric piece folded away from the second fabric piece along seam line C-D.

DETAILED DESCRIPTION OF THE INVENTION

Figure 1:
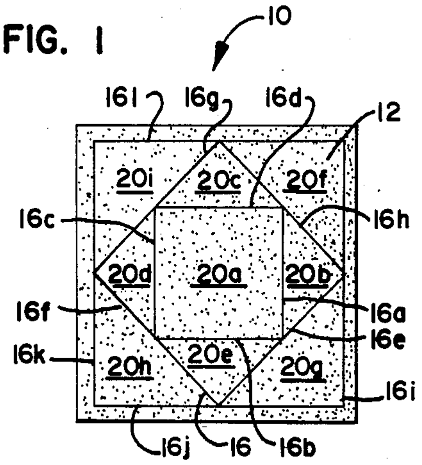
FIG. 1 illustrates the backing material, seen from the top side, showing the design formed of the proposed stitching lines.
Figure 2:
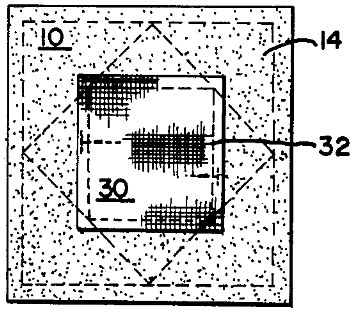
FIG. 2 illustrates the bottom side of the backing material of FIG. 1, with a first piece of fabric covering a first portion of the design.

Referring now to the drawings wherein in FIGS. 1–21 like reference numerals designate identical or corresponding parts throughout the several views, FIG. 1 shows a backing material or backing 10. The backing material should be a relatively thin flexible material which will have only little, if any, tendency to stretch. Such materials can include paper-like materials such as pressed fiber interfacings that are removable, freezer paper or freezer wrap, which is typically wax-covered paper, kraft paper, graph paper, or the like. In some cases, woven fabric such as muslin, or non-removable interfacings can also be used if the intention is not to ultimately remove the backing from the finished patchwork. For reasons to be discussed hereinafter, a non-opaque backing material, that is, one with some degree of translucency or transparency, can be desirable. Many interfacings and freezer papers have this quality. I currently prefer the use of freezer paper as a backing because of its stability and non-opaque quality. It is also very economical to use, and has a waxy side which gently adheres to the fabric during pressing, which allows for very flat, concise fabric piecing. Removable interfacings such as Stitch-n-Tear by Pellon, Trace Erase by Staceys, and iron-on tear-away stabilizer by Speed Stitch are also excellent products to use with my method, as they also are non-opaque, stable, and are easily removed from the joined fabric pieces. Freezer paper and removable interfacings are readily available.

Backing 10 has a top or upper side 12 and a bottom or reverse side 14. As will be seen, sewing occurs along top side 12, while fabric pieces to be joined are placed against bottom side 14.

A pattern or design 16 appears on top side 12. After using the method of the invention, pattern 16 will be re-created from joined fabric pieces.

The pattern used in my method represents the appearance of the finished design with the segments or portions pieced together; it does not show the seam allowances of the segments. The pattern is in the actual size of the finished pieced product, whether it is a quilt block, a yoke for a garment, a pillow top, etc. This is in contrast to the many individual "patterns" with seam allowances representing individual segments, that are often used in traditional piecing methods.

Pattern 16 comprises proposed stitching lines. At FIG. 1, the proposed stitching lines are designated as 16*a*–16*l*. Preferably, the proposed stitching lines are easy to see, and will not smudge or rub off onto fingers or fabric.

The lines may be formed of inks or other suitable substances. If desired, the lines may be formed by a series of holes in the backing material. Several pieces of backing material having the same pattern can be created by stacking the several pieces, placing over the stack a piece of backing material having a pattern of proposed stitching lines on it, and then sewing along the proposed stitching lines of the top piece of backing material, using a sewing machine, preferably without thread. This transfers the pattern from the top piece of backing material through the stack, such that each piece of backing material includes the pattern of proposed stitching lines formed of a series of needle holes.

The pattern includes various segments or portions designated in FIG. 1 as 20*a*–20*i*. 20*a* illustrates a first portion having boundaries, 20*b* illustrates an adjacent second portion having boundaries, 20*c* illustrates a third portion having boundaries, 20*d* illustrates a fourth portion having boundaries, and so on. The boundaries of the portions are generally formed by the proposed stitching lines. As seen in FIG. 1, first portion 20*a* and adjacent portion 20*b* are separated by proposed stitching line 16*a*.

If desired, backing 10 can include sewing information, such as the block number, if it is one of many for a larger project, and arrows to illustrate the proper orientation of the block in the finished article. In addition, one can indicate grain lines, notes regarding which fabrics to use for the various segments, numbers to indicate the sewing sequence among the various segments, and so on.

To begin re-creating the pattern indicated on backing 10 from joined fabric pieces, one obtains a first piece of fabric 30. The first piece of fabric will have a front side 32 and a back side 34. The front side is that side of the fabric which is to be visible from the top of the completed quilt face or other project. It often has a more desirable or aesthetically pleasing appearance than the back side. Where there is a difference in appearance between front side 32 and back side 34, front side 32 would generally be the "right" side of the fabric, while back side 34 would be the "wrong" side of the fabric.

First fabric piece 30 should be larger than the portion of the pattern which it is to re-create or to cover. In the Figures, when pattern 16 is re-created from joined fabric pieces, portion 20*a* will be formed of first piece 30. Consequently, first piece 30 must be larger than first portion 20*a*. By larger, I mean that the area of the fabric piece will be greater than the area of the corresponding pattern portion, and also that the fabric piece is of such a shape that when it is laid over the corresponding portion, it will cover that portion with some excess.

First piece 30 is placed against bottom side 14 of backing 10 such that it covers and extends beyond the boundaries of first portion 20*a*. Fabric piece 30 should extend beyond the proposed stitching lines where it is to be joined to other fabric pieces covering other segments. For example, first piece 30 should extend beyond the proposed stitching line 16*a* which separates it from second portion 20*b*.

Fabric piece 30 is placed with back side 34 against bottom side 14 of backing material 10. If the proposed stitching lines are also apparent from the back side 34 of backing 10 (for example, if backing 10 is non-opaque, if the proposed stitching lines are formed of a sequence of holes, or if the proposed stitching lines happen to be drawn on back side 34 as well as front side 32) then proper placement of fabric piece 30 is quite simple. If there is no indication of the proposed stitching lines from back side 34, as in the case of batting being used, then correct placement of piece 30 can be quite easily determined by sticking a pin in one or more places along the proposed seam line from the backing 10 side through piece 30, and observing from the pin placement whether the fabric piece covers the right area and properly extends beyond the proposed stitching lines.

When a fabric piece is properly placed, I suggest that it be pinned to maintain it in position. For ease of sewing and removal of the pins, I recommend that the pins be inserted from the top side of backing 10. The Figures illustrate suggested pin placements.

A second piece of fabric 36 is to be joined to first piece 30, and will cover second portion 20*b* when the steps of my method have been completed.

Second piece of fabric 36 has a front side 38, and a back side 40. As with first piece 30 (and all of the other pieces), front side 38 will typically be the "right" or more pleasing side of the fabric, while back side 40 will typically be the "wrong" side of the fabric.

According to the method of my invention, front side 38 of second piece 36 is placed against front side 32 of first piece 30. Second piece 36 should overlap proposed stitching line 16*a* which separates first and second portions 20*a* and 20*b*, and a sufficient amount of second piece 36 to cover second portion 20*b* should extend from the proposed stitching line toward or across the first portion, as shown. It should be noted that each fabric piece utilized in my method is generally larger than the portion of the pattern to which it corresponds; for example, second piece 36 will be larger than second portion 20*b*.

Figure 3:
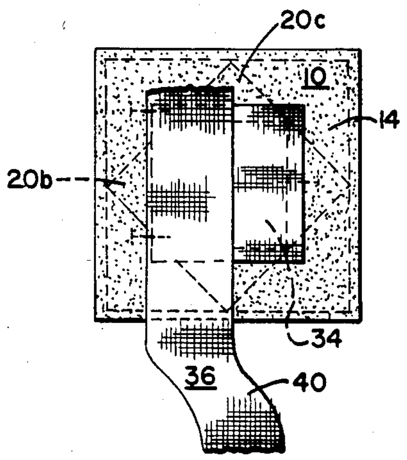
FIG. 3 illustrates a second piece of fabric placed over the first piece of fabric shown in FIG. 2.

Proper placement of second piece 36 is illustrated in FIG. 3. It should be noted that the fabric pieces need not have the shapes illustrated in the Figures; so long as they are large enough to cover their respective or corresponding portions, they can have virtually any shape.

Figure 4:
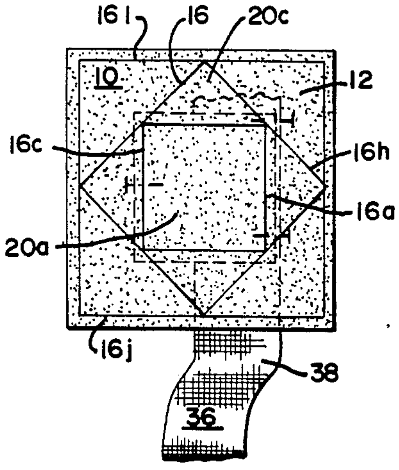
FIG. 4 illustrates the reverse side of FIG. 3.

Once pieces 30 and 36 are in place, they can be sewn together. FIG. 4 illustrates top or upper side 12 of backing 10, from which side the stitching will take place. Typically, the sewing or stitching will be done by machine, with any suitable straight stitching sewing machine. To join fabric pieces 30 and 36, the sewing is done along proposed stitching line 16*a*, or between point A and B illustrated at FIG. 6. The sewing step involves simultaneously sewing through backing 10, first piece 30 and second piece 36 by sewing along proposed stitching line 16*a* on top side 12 of backing 10. This joins the first and second pieces and forms a seam between points A and B of FIG. 6. The seam results in what I describe as a single piece of fabric composed of joined fabric pieces, as opposed to the smaller or individual, unjoined pieces which existed prior to the sewing step. I prefer to start and end the sewing one or two stitches on either side of points A and B, using lock-stitching, sewing in place, or hand tying of a knot to lock the row of stitches in place.

Figure 5:
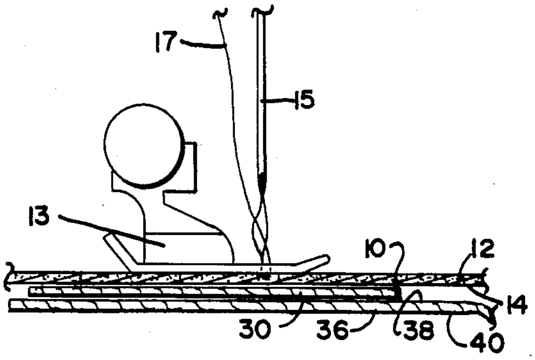
FIG. 5 illustrates a stitching step.
Figure 6:
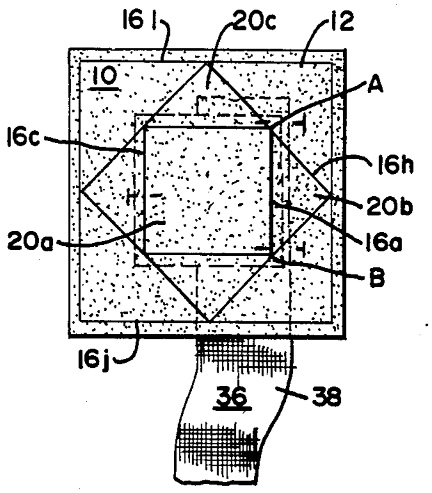
FIG. 6 is the same view as FIG. 4, illustrating the seam line between points A and B.

The sewing step is represented at FIG. 5. A presser foot, needle, and thread are represented as 13, 15, and 17 respectively.

Figure 7:
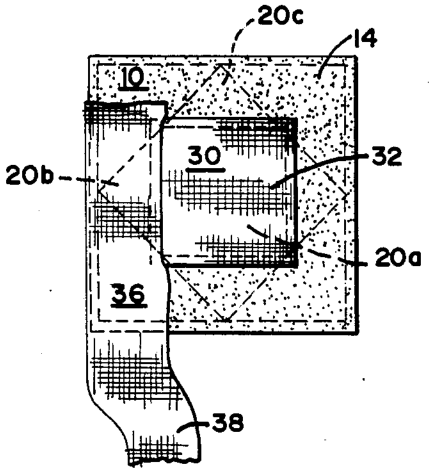
FIG. 7 illustrates the bottom side of the backing material, with the second fabric piece folded away from the first fabric piece along the seam line.
Figure 8:
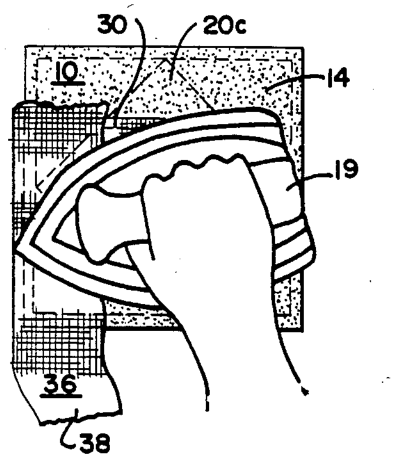
FIG. 8 illustrates pressing the seam open.
Figure 9:
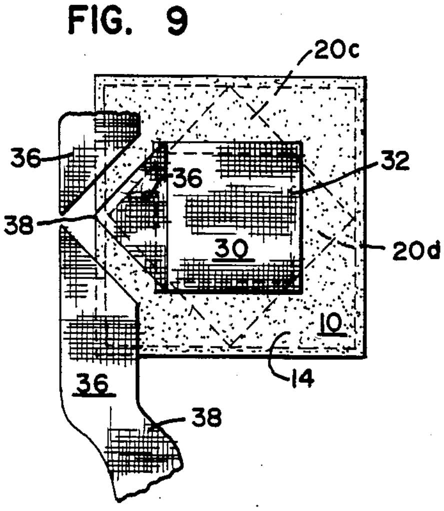
FIG. 9 illustrates trimming the second fabric piece.

As illustrated in FIG. 7, after the seam is sewn, second piece 36 is folded away from first piece 30, along the newly-created seam. This folding is in the direction of second portion 20*b*. After folding, the first and second pieces should be side by side in a substantially coplanar relationship, with the first piece covering the first portion and the second piece covering the second portion. The front sides 32 and 38 of the first and second pieces are both facing in the same direction after this step. If necessary, due, for example, to the texture of second piece 36, the second piece can be flattened against backing 10 over second portion 20*b*. This can be accomplished at least in part by pressing, for example with an iron 19, as shown in FIG. 8, or simply with fingers or hand pressure along the seam line. To help second piece 36 remain in a coplanar relationship with respect to piece 30, and to help it maintain the proper position over pattern portion 20*b*, it may be desirable to crease second piece 36 along the seam when folding it away from first piece 30. It is preferable to accomplish this with an iron, as in FIG. 8.

After second piece 36 has been folded away from first piece 30 and positioned over portion 20*b*, it can be trimmed. This is particularly desirable if second piece 36 is relatively large in comparison to second portion 20*b*. The piece can be trimmed so that it extends to or somewhat beyond the boundaries of its corresponding portion, 20*b*. It is usually desirable to allow it to extend somewhat beyond the boundaries to provide for a seam allowance along the edges of the piece. While the width of the seam allowance is rarely critical, I recommend a seam allowance of about one eighth to five eighths of an inch. I recommend a one-quarter inch seam allowance for most purposes. Where the fabric has a tendency to ravel, such as velvet, a wider seam allowance such as five-eighths inch can be advantageous. Where very small fabric pieces are used, as when sewing a miniature, a smaller seam allowance such as one-eighth inch is preferable to reduce bulk.

Figure 10:
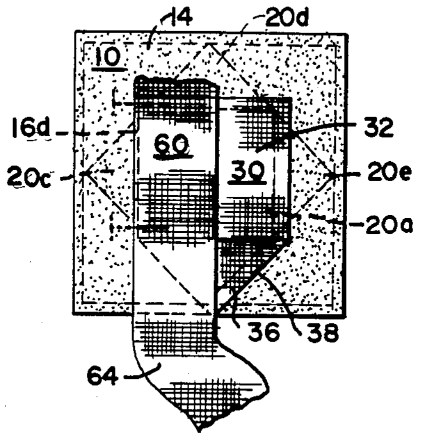
FIG. 10 illustrates the positioning of an additional fabric piece.

The steps as generally described above can be repeated as each pattern portion is covered or recreated by a piece of fabric. For example, FIG. 10 illustrates a third piece of fabric 60 having a front side 62 and a back side 64, which will be used to cover pattern portion 20*c* (which I will occasionally refer to as the third portion). Pattern portion or segment 20*c* is separated from pattern portion 20*a* by proposed stitching line 16*d*. Fabric piece 60 is placed with front side 62 against front side 32 of fabric piece 30. It is placed such that piece 60 overlaps proposed stitching line 16*d* and a sufficient amount of it to cover portion 20*c* extends from the proposed stitching line toward or across portion 20*a*, as illustrated in FIG. 10. A sewing step corresponding to the step illustrated in FIG. 5 is then conducted, from top side 12 of backing material 10 along proposed stitching line 16*d*. Then, the third fabric piece is folded away from the first piece and toward or over the corresponding third portion along the newly sewn seam, so that the third piece and the previously joined fabric pieces are side by side in a substantially coplanar relationship and the third piece covers it corresponding portion 20*c* of the pattern 16. Again, if desired, the third piece can be flattened against the backing material over the third portion. This can be accomplished at least in part by pressing with the fingers, hand, an iron, or in any other suitable way. If desired, the third piece can be trimmed so that it more precisely conforms to the shape of its corresponding pattern segment, and preferably, the trimming will allow for a seam allowance.

Figure 11:
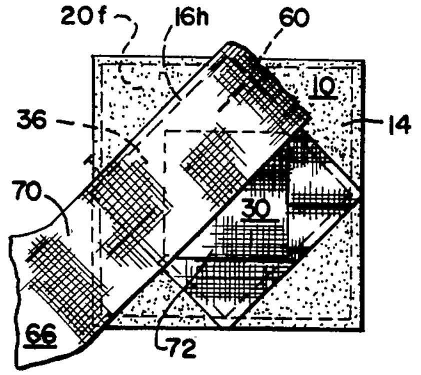
FIG. 11 illustrates the positioning of an additional fabric piece.
Figure 12:
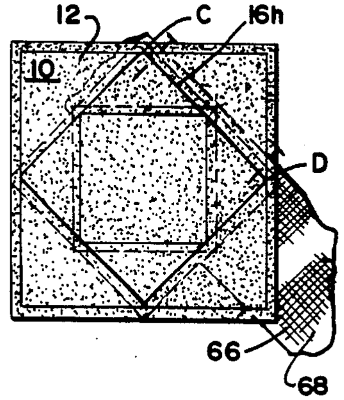
FIG. 12 illustrates the reverse side of FIG. 11, with stitching or seam line C-D.
Figure 13:
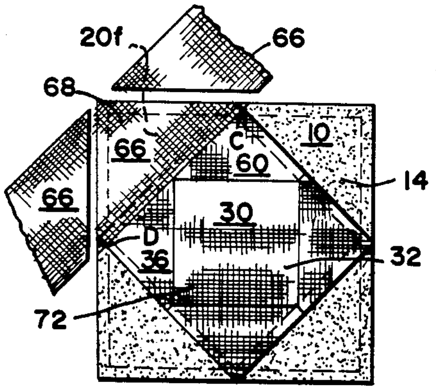
FIG. 13 illustrates a trimming step.
Figure 14:
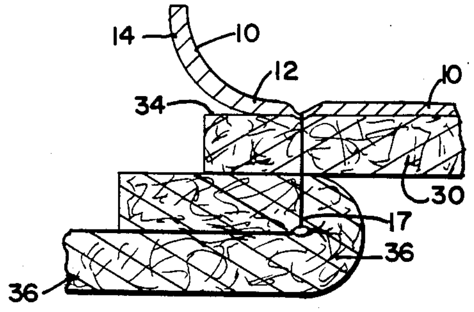
FIG. 14 is a cross-sectional view showing removal of the backing material from the fabric layers. It is greatly exaggerated for reasons of clarity.

Additional similar steps can be taken to add fabric pieces corresponding to pattern portions 20*d* and 20*e*. Additional similar steps can also be taken to join fabric pieces corresponding to pattern segments 20*f, g, h,* and *i*. As an example, FIGS. 11–13 illustrate the addition of fabric piece 66 having front side 68 and back side 70. It is placed against larger fabric piece 72 composed of joined fabric pieces including 30, 36, and 60. Placement of fabric piece 66 is illustrated in FIG. 11, and is similar to the placement steps shown in FIGS. 3, 4, and 10. FIG. 12 illustrates top or upper side 12 of backing 10 and proposed stitching line 16*h*. Sewing is to occur along proposed stitching line 16*h*, or between C and D of FIG. 12. Again, sewing occurs along a visible line, from the top side 12 of the backing material 10. None of the previously joined fabric pieces are attached to that side, so that there should be no obstructions or any difficulties in sewing the seam very straight and precisely where it should be.

After a "folding away" step such as that illustrated in FIG. 7, fabric piece 66 will be side by side with larger fabric piece 72 to which it was sewn. It will be in a substantially coplanar relationship with piece 72, and piece 66 will cover its corresponding pattern portion, 20*f*. As with the previously sewn pieces, fabric piece 66 can be flattened against the backing material if necessary, and can, of course, be pressed if desired. As with the other pieces, it may be desirable to trim piece 66, which is illustrated in FIG. 13.

The general steps described above can be repeated until each pattern portion is covered with fabric.

Once fabric pieces have been joined by this method to form a single larger piece of fabric composed of the joined fabric pieces which re-create the pattern, it may be desirable to remove the backing material. Since all of the fabric pieces are sewn to one another, the presence of the backing material is not necessary to hold the pieces together. Many times the backing can be removed by simply pulling it gently away from the joined fabric pieces (see FIG. 14). This is generally true of backings formed of freezer paper, kraft paper, or graph paper, or the removable interfacings such as the Stitch-N-Tear or Trace Erase products. Removal of the backing leaves one with a single piece of fabric composed of precisely joined fabric pieces.

Typically, the pattern re-created by the joined pieces by the method of my invention will have very precise alignment and crisp points and corners. It will generally appear to have been very skillfully and carefully pieced. Apart from the superior appearance of the work, there is generally no indication from examining the piece itself that it was quickly and easily prepared according to the method of my invention.

It is to be understood that the fabric pieces referred to herein are not necessarily individual, unattached pieces of fabric composed of a single piece, such as is illustrated by 30, 36, and 60. Any of the fabric pieces can be composed of previously joined fabric pieces. This can include fabric sections or pieces that have been joined by Seminole piecing, multiple piecing, or pieced with the Perfect Pieced Triangle method, as illustrated in *The It's Okay If You Sit On My Quilt Book,* by M. E. Hopkins, on page 21. In addition, the fabric pieces referred to herein need not be detached from the backing. For example, fabric piece 72 illustrates a fabric piece composed of joined fabric pieces. Piece 72 also illustrates a fabric piece previously attached to the backing 10 (e.g., by way of seams such as seam A-B). Thus, where I speak of a "first piece of fabric," it is not necessarily an individual single non-joined piece such as 30.

Figure 23:
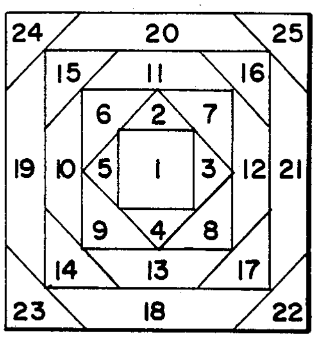
Figure 27:
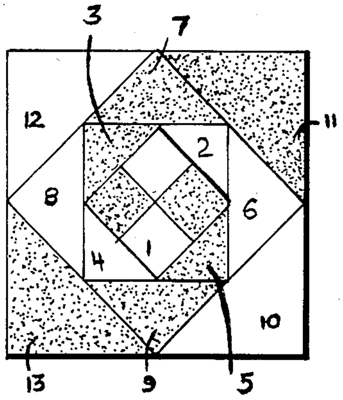

It should also be understood that the method of my invention is applicable to a wide variety of patterns or designs. The pattern illustrated in FIG. 1 is a pattern sewn from the center out. It (FIG. 1) is part of the "storm-at-sea" design, as known by those familiar with traditional quilt designs. The "storm-at-sea" design is composed of four differing square or rectangular smaller blocks together forming a single block of the pattern. Each smaller block can be sewn from the center out according to the method of my invention and then the four can be joined to form the single block of "storm-at-sea." An example of the design and a quilt is illustrated in *Patchwork & Quilting,* Better Homes and Gardens, Meredith Corporation, 1977, pages 58-59. The FIG. 1 is also a center and beginning of the design known as "pineapple," as seen in FIG. 23. Most patterns sewn from the center out will be suitable for the successful use of my method. Patterns which can be sewn from the center to the outside of a block include the two above-mentioned designs, "County Line Waves" or "Snail" (FIG. 27) (illustrated in *The It's Okay If You Sit On My Quilt Book,* M. Hopkins, page 72), and the traditional "log cabin" block and log cabin variations such as "courthouse steps," "triangle log cabin," and the "log cabin hexagon", as well as many other designs. It should be noted that the four square at the center of "Snail" (FIG. 27) would first be pieced in a traditional way to form a larger square; the method of my invention can be used from that point on.

Figure 22:
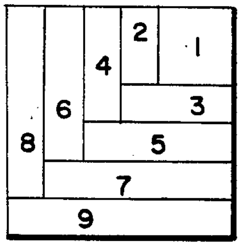
Figure 26:
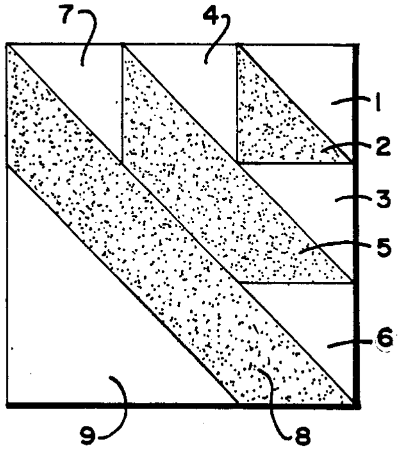

It must also be understood that my method is useful with numerous other patterns which are not sewn from the center out, such as the "chevron log cabin" (FIG. 22), and "sailboat" (FIG. 26).

Figure 24:
Figure 25:
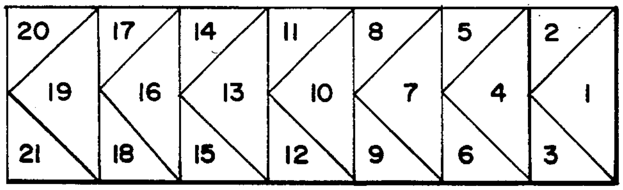

Many traditional patterns can be broken down into strips or sections of repeating designs, and my method can be used in piecing these strips or sections. For example, the "goose chase" (FIG. 25), formed of triangles, is used in many designs and is often used for borders. It can be easily, precisely made by the method of my invention. In addition, the "wedding ring" curved arc sections can be formed according to the method of my invention, and then inset in traditional ways into the rest of the quilt face. Using my method overcomes the burden of cutting the many tiny rectangular-type pieces required for the arc sections, and the difficulties involved in sewing in the bias sides of arc segments. Strips of hexagon halves are also easily made by the method of my invention, and by sewing such strips together, rows of hexagons are created, enabling one to machine piece the many "Grandmother's Flower Garden" variations. My method is also useful for forming strips of squares, rectangles, triangles (FIG. 24), and other shapes.

My method can also be used to form pieced sections of a garment. For example, it is sometimes desirable to piece a yoke (FIG. 21), a pocket, vest back, or other garment section, to beautify a garment.

FIGS. 21-27 illustrate just a few of the possibilities, with the pattern segments numbered in the suggested order for piecing.

Generally, my method is adaptable to patterns where adjacent pieces to be sewn together have a shared boundary which is the same length along each piece. It can be seen that this criterion is met by the patterns illustrated in the Figures. Some blocks (for example "storm-at-sea") can be broken down into sections where my method can be used, and then those sections can be joined in the traditional way. This provides all of the advantages of my invention, except along those seams where the traditional method is used. Even along those seams, one has avoided the need to separately cut individual pieces.

In another embodiment of my invention, it is possible to piece and quilt at the same time, or "quilt-as-you-go". Quilted fabric generally fabric generally is composed of a permanent lining or lining material, a top layer of fabric, and, between the two, stuffing of some kind such as batting. Stitching through these three layers holds them together and is often done in a decorative pattern.

Where the method of my invention is used for quilting, the lining 80 will generally serve as the backing or backing material 10 previously described. Thus, the backing should be of sufficient quality to form a permanent part of the quilted item, and will thus generally be fabric. I do not recommend freezer paper, light-weight removable interfacing, or the like, for the backing in this instance. The lining will have a top side 82 an a bottom side 84.

The pattern 74 composed of proposed stitching lines 76*a* and 76*b* (seen in phantom, FIG. 15), should appear directly on the lining material 80, and will preferably be removable. Thus, chalk, powder, tracing paper, or the like may be used. The pattern should appear on the top or right side 82 of the lining 80, that is, the side which will be exposed once the quilting is completed.

As an alternative to having the pattern drawn directly on the lining, the pattern can be indirectly applied to the lining. A removable backing (not shown) such as those described previously as 10 can bear the pattern and be removably attached to the top surface side 82 of the lining to serve as the stitching guide. In this case, it may be desirable to use a non-staining removable adhesive or basting stitches, to secure the backing with the pattern against the lining so that it will not shift or slip. Freezer paper of Iron-On Stabilizer can be used with the waxy side pressed against the lining with the iron, although some basting may be needed to prevent the paper from shifting during the piecing. The backing will have a top side bearing the pattern, and a bottom or back side.

If a separate backing bearing the pattern is used, the top or right side 82 of the lining is laid on the bottom side of the backing, so that the lining does not cover any proposed stitching lines of the pattern.

The lining has a top side 82 and a bottom side 84, the top side having a pattern 74 to be re-created from joined fabric pieces; the top side either bears the pattern directly or by virtue of a removable backing in contact with it. As before, the pattern includes a first portion 92*a* having boundaries which are evident as the surrounding dashed lines in FIG. 15, and an adjacent second portion 92*b* having boundaries which are also evident as the surrounding dashed lines in FIG. 15, the first and second portions being separated by a proposed stitching line 76*a*. There can, of course, be additional pattern segments or portions such as 92*c*.

Fabric pieces to cover the first and second pattern portions 92*a* and 92*b* are obtained. The first piece 96 of fabric has a front side (typically the "right" side) 98 and a back side 100, and is larger than the first portion 92*a* of the pattern 74. The second piece of fabric 102 also has a front side (typically the "right" side) 104 and a back side 106, and is larger than the second portion 92*b* of the pattern 74.

According to my method, a piece of batting 108 or other stuffing material is placed against the bottom side 84 of the lining 80. Lining 80, beneath batting 108, is shown in the cut-away area of FIG. 15. Batting 108 is placed so that it covers at least a portion of the proposed stitching line 76*a;* often it is desired to quilt the entire pattern and, for convenience, the batting will then generally extend over the entire pattern. In any event, the batting will generally extend at least to the boundaries of those adjacent portions where quilting is desired. The back side 100 of the first fabric piece 96 is then placed against the batting 108 such that the first piece 96 covers the first portion 92*a* and extends beyond the proposed stitching line 76*a*. Because of the batting 108 and the often opaque quality of the lining 80, generally it will not be possible to see whether the first fabric piece 96 is properly placed with respect to the first portion, simply by a visual inspection. However, to determine whether it is properly placed; for example, one can determine the boundaries of the pattern portion and the placement of the fabric piece by piercing the layers in several places with a pin, along the seam or sewing line, to determine precisely where the layers are in relation to each other. Usually, one need only check placement by piercing at the opposite ends of the proposed stitching line.

Figure 15:
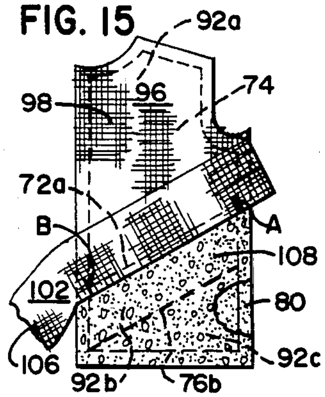
FIGS. 15–19 illustrate an alternative embodiment where a batting material is used.

As seen in FIG. 15, the front or right side 104 of the second piece of fabric 102 is placed against the front or right side 98 of the first piece of fabric 96 such that the second piece 102 overlaps the proposed stitching line 76*a* and a sufficient amount of the second piece 102 to cover the second portion 92*b* extends from the proposed stitching line 76*a* toward or across the first portion 92*a*. Again, the pin-checking method described above can be used to see that the second fabric piece is properly placed.

Figure 20:
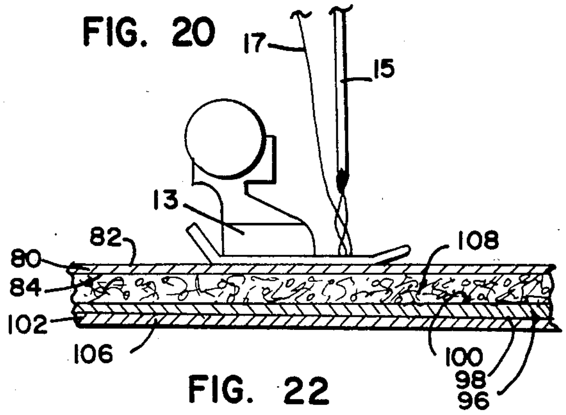
FIG. 20 illustrates a stitching step. It is a cross-sectional view showing the backing material, the batting, a first fabric piece, and a second fabric piece.
Figure 21:
FIGS. 21–27 illustrate designs with which the method of my invention can be used. The shading in FIGS. 26 and 27 merely illustrates the use of contrasting fabrics in forming the design.

Next, one can sew through these layers, i.e., the lining 80, the batting 108, and the first 96 and second 102 pieces of fabric, by sewing along the proposed stitching line 76*a* on the top side 82 of the backing material or lining 80, to join the first and second pieces and form a seam. At the same time, these pieces are sewn to the lining 80, through the batting 108, thus resulting in a quilted product. A sewing step is illustrated in FIG. 20.

Figure 16:
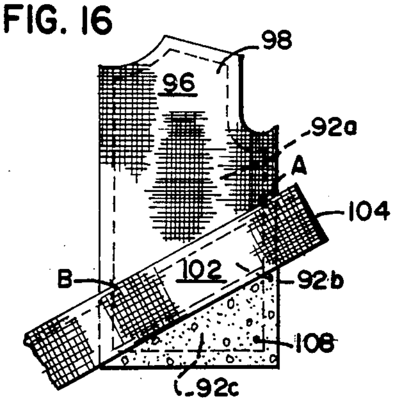

Next, as shown in FIG. 16, the second piece of fabric 102 is folded away from the first piece 96 and toward the second portion 92*b*, along the seam A-B, so that the first and second pieces are side by side in a substantially coplanar relationship and the second piece 102 covers the second portion 92*b*. The fabric pieces, of course, cover the pattern portions only indirectly, since there is batting 108 between those pieces and the lining material or backing 80. If desired, or necessary to maintain the substantially coplanar relationship of the fabric pieces, the second piece can be flattened against the batting over the second portion. This can be done at least in part by pressing, either with the fingers, hand pressure, an iron, or the like.

Figure 17:
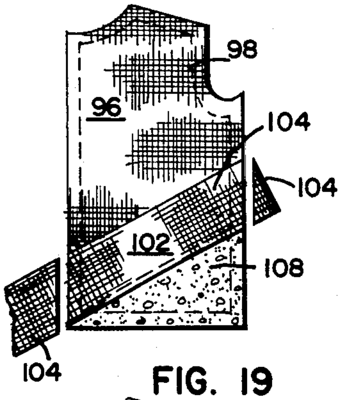

In addition, the pieces (usually the second piece) can be trimmed so that they extend to or somewhat beyond (e.g., one-eighth to five-eighths inch) the boundaries of their corresponding pattern portions (see FIG. 17).

Next, an additional fabric piece 110 corresponding to an adjacent pattern portion 92*c* can be placed, sewn, and folded out as previously described, and pressed and/or trimmed if desired. As with the other fabric pieces, the additional fabric piece 110 will have a front or right side 112 and a back or wrong side 114.

Figure 18:
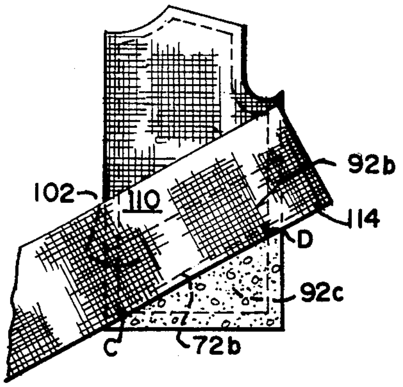

As shown in FIG. 18, the right side 112 of fabric piece 110 is placed against the right side 104 of fabric piece 102. It is placed such that fabric piece 110 overlaps proposed stitching line 76*b* which separates adjacent portions 92*b* and 92*c*. A sufficient amount of the additional fabric piece 110 to cover the third portion 92*c* extends from proposed stitching line 76*b* toward or across second portion 92*b* and second fabric piece 102. It is advisable to use the pin checking method to see that the fabric piece 110 is properly placed, especially with respect to the proposed stitching line 76*b* which appears on top side 82 of lining 80. Generally it is desirable to have fabric piece 110 overlap proposed stitching line 76*b* by at least one-eighth to five-eighths inch, which provides for a seam allowance.

Next, one sews from top side 82 of lining 80 along proposed stitching line 76*b* or seam line C-D to form a seam. The sewing step (corresponding to the one shown in FIG. 20) joins the lining 80, batting 108, second fabric piece 102, and the additional fabric piece 110.

Figure 19:
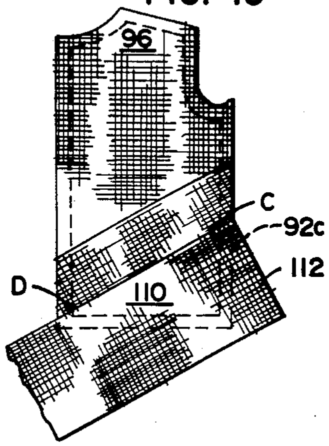

Next, as shown in FIG. 19, the additional fabric piece 110 is folded away from the second fabric piece 102 along seam line C-D. The additional fabric piece 110 will be in a substantially coplanar relationship with the previously joined fabric pieces (e.g., 96 and 102) and will (indirectly) cover its corresponding pattern portion 92*c*. It can, of course, be flattened and pressed, if desired, to help maintain the proper positioning.

The additional fabric piece 110 can be trimmed, if desired (not shown). These steps can be repeated until the pattern has been re-created from joined pattern pieces.

The batting can be large enough to cover as many adjacent pattern portions as desired; often it will be selected to cover the entire pattern. More than one layer or thickness of batting or other stuffing material can, of course, be utilized.

In my FIGS. 15–20, I have shown the simultaneous piecing and quilting of a front side portion of a garment, which will ultimately be joined with other pieces to form a vest. The method is equally useful for piecing and quilting portions of other types of garments, quilt blocks or quilt faces, pieced pillow tops, wall hangings, bibs, and so on.

Numerous characteristics and advantages of my invention have been set forth in the foregoing description. It will be understood, of course, that this description is in many respects only illustrative. Since one skilled in the art can practice variations without departing from the spirit and scope of the invention, the invention is embodied in the claims as follows.

I claim:

1. A method for joining fabric pieces with the aid of a backing material to form a single piece of fabric composed of joined fabric pieces, which comprises:

(a) obtaining a backing material having a top side and a bottom side, the top side having a pattern to be re-created from joined fabric pieces, the pattern including a first portion having boundaries and an adjacent second portion having boundaries, the first and second portions being separated by a proposed stitching line;

(b) obtaining a first piece of fabric having a front side and a back side, the first piece being larger than the first portion of the pattern;

(c) obtaining a second piece of fabric having a front side and a back side, the second piece being larger than the second portion of the pattern;

(d) placing the back side of the first piece against the bottom side of the backing material such that the first piece covers the first portion and extends beyond the proposed stitching line;

(e) placing the front side of the second piece against the front side of the first piece such that the second piece overlaps the proposed stitching line and a sufficient amount of the second piece to cover the second portion extends from the proposed stitching line toward the first portion;

(f) simultaneously sewing through the backing mateial, the first piece and the second piece by sewing along the proposed stitching line on the top side of the backing material to join the first and second pieces and form a seam, resulting in a single piece of fabric composed of joined fabric pieces; and (g) folding the second piece away from the first piece and toward the second portion along the seam so that the first piece and the second piece are side by side in a substantially coplanar relationship and the second piece covers the second portion.

2. The method of claim 1 wherein step (g) includes flattening the second piece against the backing material over the second portion.

3. The method of claim 1 wherein step (g) is accomplished at least in part by pressing.

4. The method of claim 1 which, after step (g), further comprises the step of trimming the second piece so that it extends to or somewhat beyond the boundaries of the second portion.

5. The method of claim 1 which further comprises the step of removing the backing material from the single piece of fabric composed of joined fabric pieces.

6. The method of claim 1 wherein the backing material is non-opaque.

7. The method of claim 1 wherein the backing material is a non-opaque paper-like material.

8. A method for creating a single piece of fabric comprising smaller fabric pieces joined in a pattern, which comprises:

(a) obtaining a backing material having a top side and a bottom side, the top side having a pattern formed of proposed stitching lines, the lines defining a first pattern portion having boundaries and a second pattern portion having boundaries, the first and second pattern portions being adjacent and separated by a first proposed stitching line, the backing material having sewn to its bottom side a piece of fabric having a front side and a back side, the back side of the piece of fabric being in contact with the bottom side of the backing material, the piece of fabric covering the first pattern portion;

(b) obtaining a second piece of fabric having a front side and a back side, the second piece being larger than the second pattern portion;

(c) placing the front side of the second piece against the front side of the first piece such that the second piece overlaps the first proposed stitching line and a sufficient amount of the second piece to cover the second portion extends from the first proposed stitching line toward the first portion;

(d) simultaneously sewing through the backing material, the first piece and the second piece by sewing along the first proposed stitching line on the top side of the backing material to join the first and second pieces and form a seam, resulting in a single piece of fabric composed of joined fabric pieces; and (e) folding the second piece away from the first piece and toward the second portion along the seam so that thefirst piece and the second piece are side by side in a substantially coplanar relationship and the second piece covers the second porton, to form a single piece of fabric comprising smaller fabric pieces joined in a pattern.

9. The method of claim 8 which further comprises the step of removing the backing material from the single piece of fabric comprising smaller fabric pieces joined in a pattern.

10. The method of claim 8 wherein the backing material is non-opaque.

11. The method of claim 8 wherein the backing material is a non-opaque, paper-like material.

12. A method for joining fabric pieces together on a lining, with batting between at least two of the fabric pieces and the lining, which comprises:

(a) obtaining a lining having a top side and a bottom side, the top side having a pattern to be re-created from joined fabric pieces, the pattern including a first portion having boundaries and an adjacent second portion having boundaries, the first and second portions being separated by a proposed stitching line;

(b) obtaining a first piece of fabric having a front side and a back side, the first piece being larger than the first portion of the pattern;

(c) obtaining a second piece of fabric having a front side and a back side, the second piece being larger than the second portion of the pattern;

(d) placing a piece of batting against the bottom side of the lining, such that the batting covers at least a portion of the proposed stitching line;

(e) placing the back side of the first piece against the batting such that the first piece covers the first portion and extends beyond the proposed stitching line;

(f) placing the front side of the second piece against the front side of the first piece such that the second piece overlaps the proposed stitching line and a sufficient amount of the second piece to cover the second portion extends from the proposed stitching line toward the first portion;

(g) simultaneously sewing through the lining, the batting, the first piece and the second piece by sewing along the proposed stitching line on the top side of the backing material to join the first and second pieces and form a seam; and (h) folding the second piece away from the first piece and toward the second portion along the seam so that the first piece and the second piece are side by side in a substantially coplanar relationship and the second piece covers the second portion.

13. The method of claim 12 wherein step (h) includes flattening the second piece against the batting over the second portion.

14. The method of claim 12 wherein step (h) is accomplished at least in part by pressing.

15. The method of claim 12 which, after step (h), further comprises the step of trimming the second piece so that it extends to or somewhat beyond the boundaries of the second portion.

* * * * *

UNITED STATES PATENT AND TRADEMARK OFFICE

CERTIFICATE OF CORRECTION

PATENT NO. : 4,646,666

DATED : March 3, 1987

INVENTOR(S) : Karen S. Burrier

It is certified that error appears in the above-identified patent and that said Letters Patent is hereby corrected as shown below:

Column 2, Line 42, for "of a fabric" read --of fabric--.
Column 9, Line 10, for "M. Hopkins" read --M. E. Hopkins--.
Column 9, Line 62, for "fabric generally fabric generally" read --fabric generally--.
Column 10, Line 6, for "an a bottom" read --and a bottom--.
Column 10, Line 19, for "top surface side" read --top side--.
Column 10, Line 25, for "with the iron" read --with an iron--.
Column 13, Line 57, for "thefirst piece" read --the first piece--.
Column 13, Line 59, for "porton," read --portion.--

Signed and Sealed this

Tenth Day of November, 1987

*Attest:*

DONALD J. QUIGG

*Attesting Officer*

*Commissioner of Patents and Trademarks*